United States Patent
Wang et al.

(10) Patent No.: US 12,510,631 B2
(45) Date of Patent: Dec. 30, 2025

(54) OBJECT DETECTION USING RADAR SENSORS

(71) Applicant: Motional AD LLC, Boston, MA (US)

(72) Inventors: Ting Wang, Santa Monica, CA (US); Yun Lin, Santa Clara, CA (US); Ken Power, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 344 days.

(21) Appl. No.: 18/105,183

(22) Filed: Feb. 2, 2023

(65) Prior Publication Data

US 2024/0125921 A1 Apr. 18, 2024

Related U.S. Application Data

(60) Provisional application No. 63/416,459, filed on Oct. 14, 2022.

(51) Int. Cl.
*G01S 7/41* (2006.01)
*G01S 7/288* (2006.01)
(Continued)

(52) U.S. Cl.
CPC ............ *G01S 7/417* (2013.01); *G01S 7/2883* (2021.05); *G01S 13/42* (2013.01); *G01S 13/584* (2013.01);
(Continued)

(58) Field of Classification Search
CPC ........ G01S 7/417; G01S 7/2883; G01S 13/42; G01S 13/584; G01S 13/867; G01S 13/89; G01S 13/931
See application file for complete search history.

(56) References Cited

U.S. PATENT DOCUMENTS

2019/0101634 A1* 4/2019 Baheti .................... G01S 7/415
2020/0292660 A1* 9/2020 Meissner ............... G01S 7/023
(Continued)

FOREIGN PATENT DOCUMENTS

EP        4254267 A1 * 10/2023  ............ B60W 40/10
WO    WO 2022/104296        5/2022

OTHER PUBLICATIONS

B. Major et al., "Vehicle Detection With Automotive Radar Using Deep Learning on Range-Azimuth-Doppler Tensors," 2019 IEEE/CVF International Conference on Computer Vision Workshop (ICCVW), Seoul, Korea (South), 2019, pp. 924-932, doi: 10.1109/ICCVW.2019.00121. (Year: 2019).*
(Continued)

*Primary Examiner* — Matthew M Barker
(74) *Attorney, Agent, or Firm* — Fish & Richardson P.C.

(57) ABSTRACT

Provided are methods for generation of representations of radar data. Some methods described include: receiving ADC raw data of a radar sensor of a vehicle; performing range FFT, Doppler FFT, and azimuth FFT on the ADC raw data; generating a 1D range heat map tensor representing the range FFT, a 2D RD heat map tensor representing a combination of the range FFT and the Doppler FFT, a 2D RA heat map tensor representing a combination of the range FFT and the azimuth FFT, or a 3D RAD matrix tensor representing a combination of the range FFT, the Doppler FFT, and the azimuth FFT; and inputting at least one of the 1D range heat map tensor, the 2D RD heat map tensor, the 2D RA heat map tensor, or the 3D RAD matrix tensor, to a machine learning model for detecting objects on a road network around the vehicle.

18 Claims, 14 Drawing Sheets

(51) Int. Cl.
*G01S 13/42* (2006.01)
*G01S 13/58* (2006.01)
*G01S 13/86* (2006.01)
*G01S 13/89* (2006.01)
*G01S 13/931* (2020.01)

(52) U.S. Cl.
CPC ............ *G01S 13/867* (2013.01); *G01S 13/89* (2013.01); *G01S 13/931* (2013.01)

(56) References Cited

U.S. PATENT DOCUMENTS

| | | | | |
|---|---|---|---|---|
| 2020/0333453 | A1* | 10/2020 | Mende | G01S 7/354 |
| 2020/0341109 | A1* | 10/2020 | Meissner | G01S 7/023 |
| 2021/0055407 | A1* | 2/2021 | Achour | G01S 13/931 |
| 2021/0103027 | A1* | 4/2021 | Harrison | G01S 7/40 |
| 2021/0209453 | A1* | 7/2021 | Meissner | G06N 3/04 |
| 2021/0210858 | A1* | 7/2021 | Pelletti | G01S 7/4056 |
| 2021/0255300 | A1* | 8/2021 | Harrison | G01S 13/931 |
| 2021/0255304 | A1* | 8/2021 | Fontijne | G06V 20/10 |
| 2022/0196798 | A1* | 6/2022 | Chen | G01S 7/354 |
| 2022/0252721 | A1* | 8/2022 | Carroll | G01S 13/4463 |
| 2022/0326367 | A1 | 10/2022 | Matuszak et al. | |
| 2022/0342039 | A1* | 10/2022 | Eschbaumer | G01S 7/415 |
| 2022/0404490 | A1* | 12/2022 | Evans | G01S 13/582 |
| 2023/0063476 | A1* | 3/2023 | Meyer | G01S 7/417 |
| 2023/0316775 | A1* | 10/2023 | Braun | G01S 13/931 |
| | | | | 382/103 |
| 2024/0118410 | A1* | 4/2024 | Lin | G06V 10/454 |
| 2024/0134038 | A1* | 4/2024 | Zhang | G01S 7/415 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

Cui et al., "3D Detection and Tracking for On-road Vehicles with a Monovision Camera and Dual Low-cost 4D mmWave Radars," 2021 IEEE International Intelligent Transportation Systems Conference (ITSC), IEEE, Sep. 19, 2021, pp. 2931-2937.

Gao et al., "RAMP-CNN: A Novel Neural Network for Enhanced Automotive Radar Object Recognition," CoRR, Submitted on Apr. 28, 2022, arXiv:2011.08981v2, 15 pages.

International Search Report and Written Opinion in International Appln. No. PCT/US2023/034279, mailed on Jan. 18, 2024, 14 pages.

Lim et al., "Radar and Camera Early Fusion for Vehicle Detection in Advanced Driver Assistance Systems," Machine Learning for Autonomous Driving Workshop at the 33rd Conference on Neural Information Processing Systems (NeurIPS 2019), 2019, 11 pages.

Palffy et al., "CNN based Road User Detection using the 3D Radar Cube," CoRR, Submitted on Jul. 16, 2020, arXiv:2004.12165v2, 8 pages.

Rebut et al., "Raw High-Definition Radar for Multi-Task Learning," CoRR, Submitted on Apr. 13, 2022, arXiv:2112.10646v3, 12 pages.

Zhang et al., "RADDet: Range-Azimuth-Doppler based Radar Object Detection for Dynamic Road Users," CoRR, Submitted on May 2, 2021, 8 pages.

International Preliminary Report on Patentability in International Appln. No. PCT/US2023/034279, mailed on Apr. 24, 2025, 7 pages.

* cited by examiner

OBJECT DETECTION USING RADAR SENSORS

CROSS-REFERENCE TO RELATED APPLICATION

This application claims priority to U.S. Provisional Patent Application No. 63/416,459, filed Oct. 14, 2022, the entire contents of which are incorporated herein by reference.

BACKGROUND

Radar sensors transmit electromagnetic wave signals that are reflected by objects in the environment. Radar sensors capture the reflected signals, and the reflected signals are processed to determine various properties of the environment.

DETAILED DESCRIPTION

Figure 1:
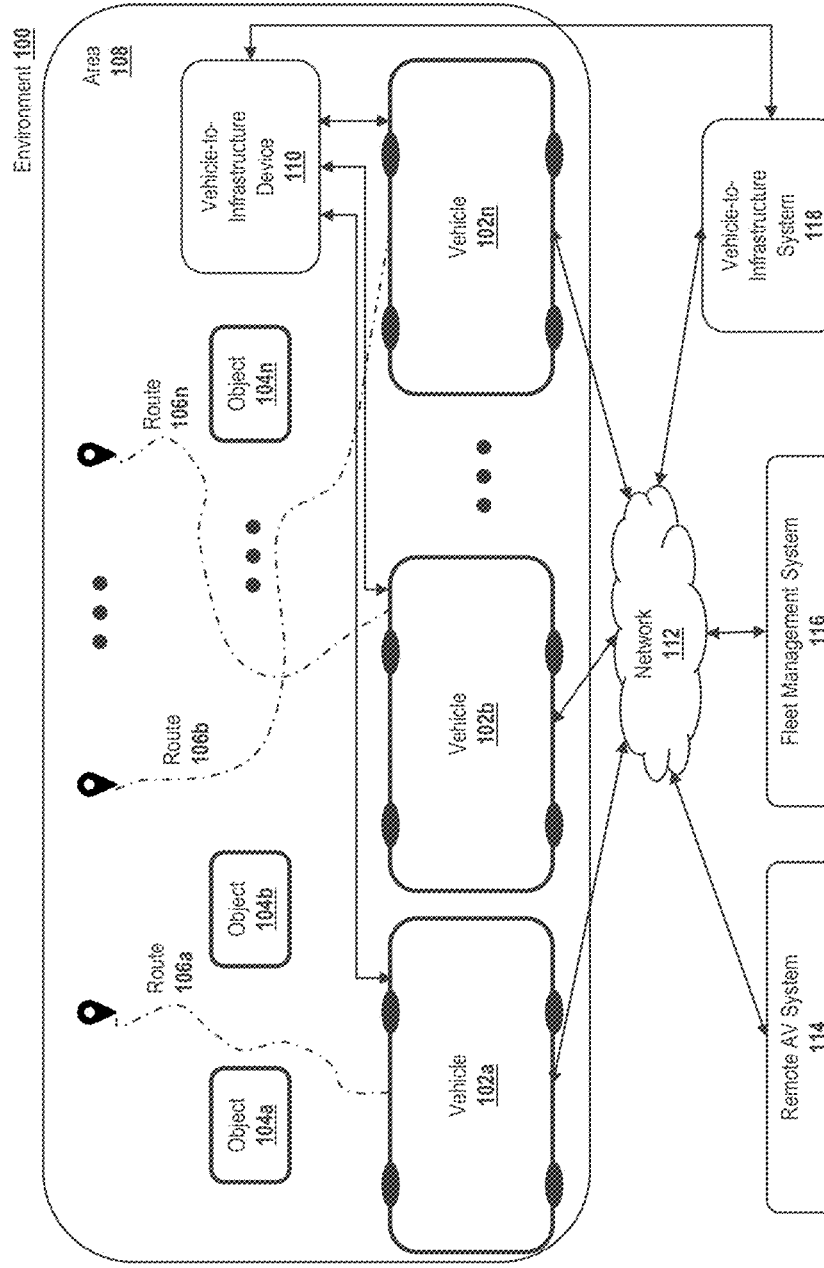
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like, are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

GENERAL OVERVIEW

This disclosure provides a plurality of configurable radar data representations (e.g., a one-dimensional (1D) range heat map tensor, a two-dimensional (2D) Range-Doppler (RD) heat map tensor, a 2D Range-Azimuth (RA) heat map tensor, a three-dimensional (3D) Range-Azimuth-Doppler (RAD) matrix tensor) from a radar sensor. At least one of the radar data representations is input to a machine learning model to detect objects. In some embodiments, a radar data representation is fused with camera images, and the fused data is input into a machine learning model to detect objects.

In some embodiments, range fast Fourier transform (FFT), Doppler FFT, and azimuth FFT are performed on raw data output by a radar sensor. The raw data is output by an analog-to-digital converter (ADC) of the radar sensor. A 1D range heat map tensor representing a radar output is generated based on range FFT data. A 2D RD heat map tensor representing a radar output is generated based on a combination of range FFT data and Doppler FFT data. A 2D RA heat map tensor representing a radar output is generated based on a combination of range FFT data and azimuth FFT data. A 3D RAD matrix tensor representing a radar output is generated based on a combination of range FFT data, azimuth FFT data, and Doppler FFT data. The 1D range heat map tensor, the 2D RD heat map tensor, the 2D RA heat map tensor, or the 3D RAD matrix tensor is provided to a machine learning model for objection detection. In some embodiments, the 1D range heat map tensor, the 2D RD heat map tensor, the 2D RA heat map tensor, or the 3D RAD matrix tensor is fused with camera images, and the fused data is provided to a machine learning model for objection detection. In some embodiment, the size of the 1D range heat map tensor, the 2D RD heat map tensor, the 2D RA heat map tensor, or the 3D RAD matrix tensor is configured based on radar specifications, such as sensing range, distance resolution, velocity resolution, angular resolution, a bandwidth of the chirp, a period of the chirp, the quantity of samples per chirp or sampling rate, the quantity of ADC channels, etc.

By virtue of the implementation of systems, methods, and computer program products described herein, some of the advantages of these techniques include providing early-stage radar output data (the radar output, with much less signal processing, is represented by 1D range heat map tensor, 2D RD heat map tensor, 2D RA heat map tensor, or 3D RAD matrix tensor), instead of a sparse point cloud, to a machine learning model. The machine learning model detects objects based on rich information in the early-stage radar data. By contrast, traditional radar sensors perform signal processing of ADC raw data, using signal filters and clustering beamforming. The signal processing "over-processes" the ADC raw data, resulting in a loss of detailed information carried by the ADC raw data. Some of the advantages of these techniques further include configuring radar output data based on radar specifications, such as sensing range, distance resolution, velocity resolution, angular resolution, a bandwidth of the chirp, a period of the chirp, the quantity of samples per chirp or sampling rate, the quantity of ADC channels, etc.

Additionally, 1D range heat map tensor is generated only based on range FFT data. Range FFT can be performed on the incoming ADC raw data in real-time (e.g., Range FFT is performed for each chirp). Unlike 2D RD heat map tensor, 2D RA heat map tensor, or 3D RAD matrix tensor, 1D range heat map tensor does not require to buffer and wait until the entire data frame (e.g., one data frame includes 256 chirps) is ready for FFT processing. Thus, 1D range heat map tensor can reduce the radar internal source (e.g., only range FFT is performed inside radar sensors), and decrease processing latency.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
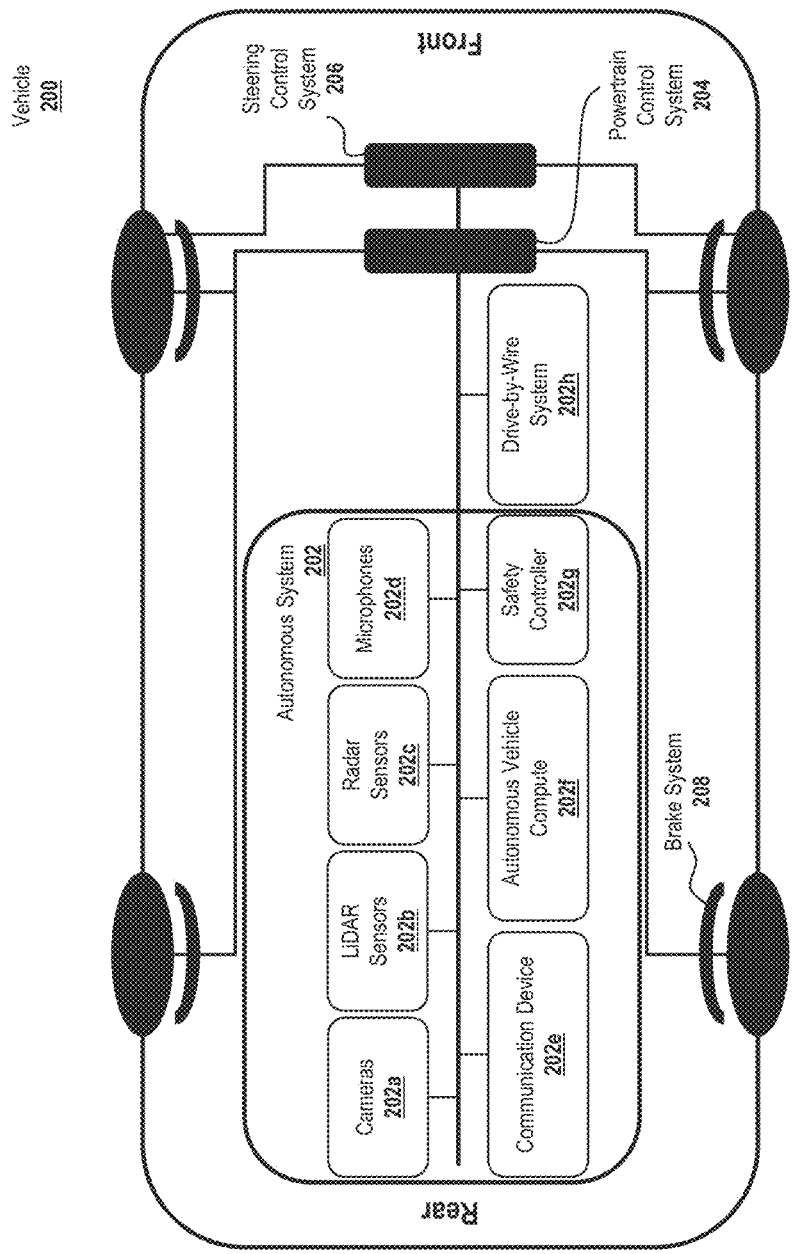
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
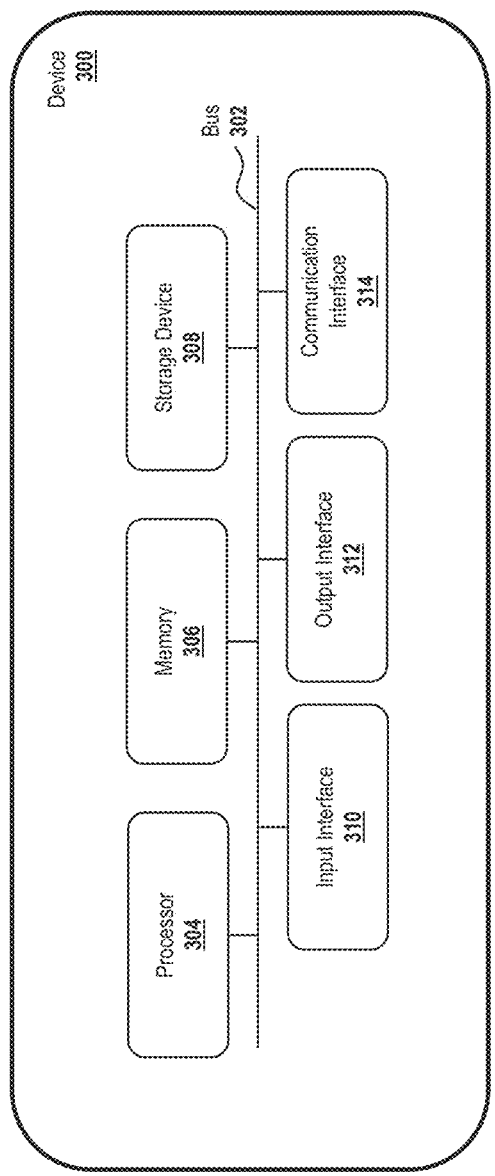
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a particular spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle (AV) compute 400, described herein. Additionally, or alternatively, in some embodiments, autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h, and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IU), a wheel speed sensor, a wheel brake pressure sensor, a wheel torque sensor, an engine torque sensor, a steering angle sensor, and/or the like. Although brake system 208 is illustrated to be located on the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi© interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
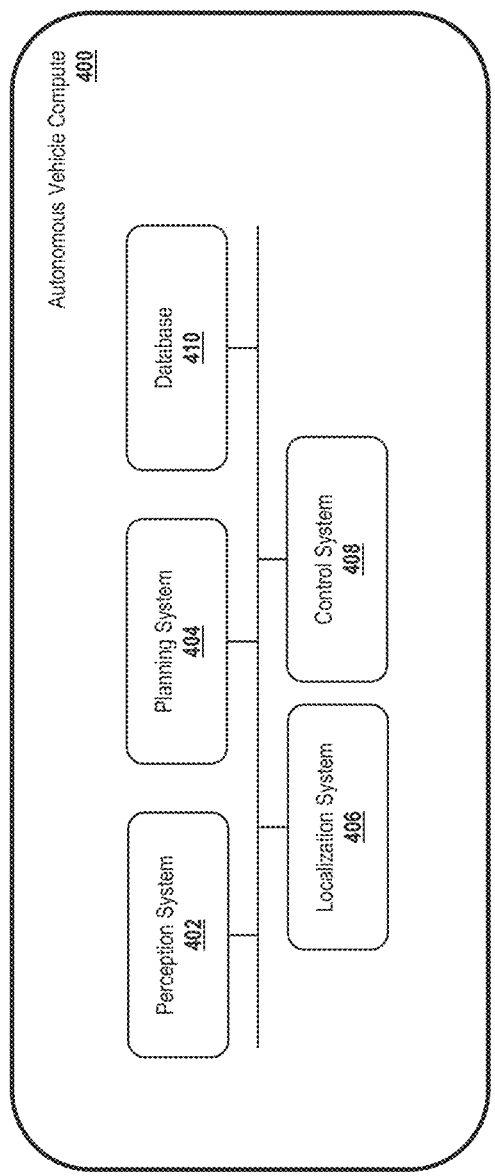
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the quantity of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406, and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
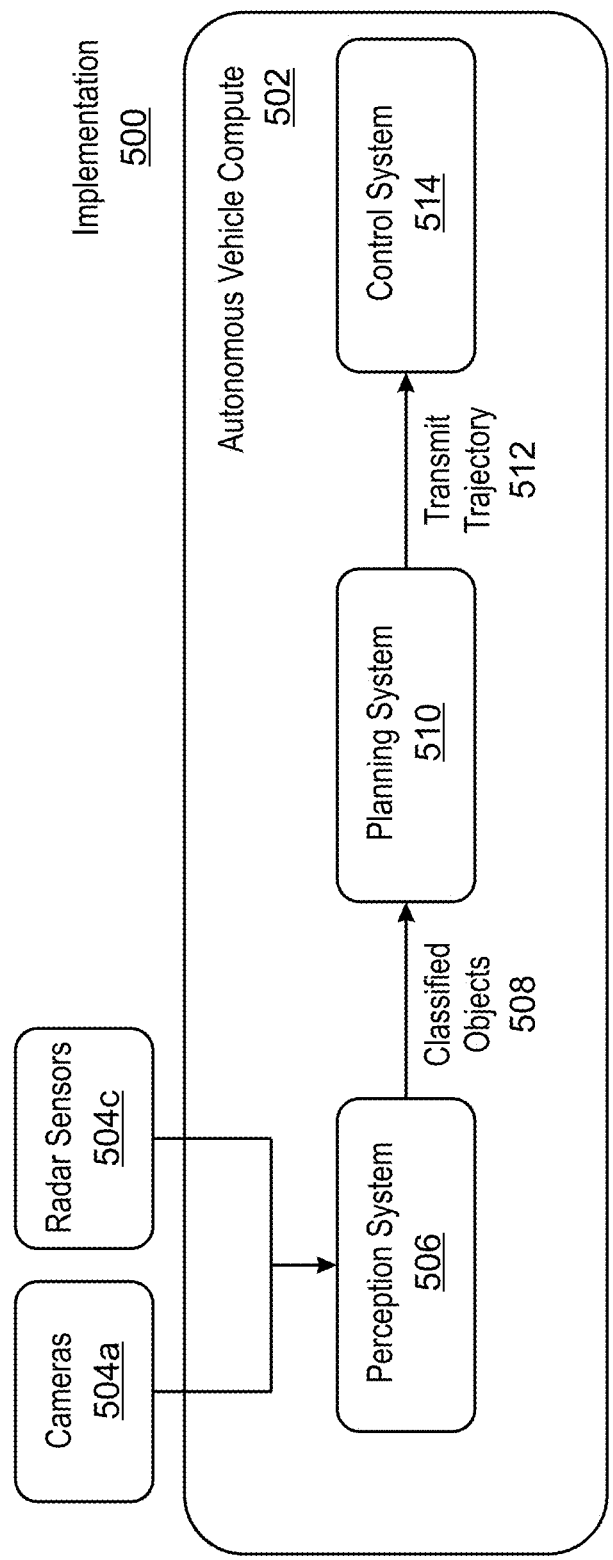
FIG. 5 is a diagram of an implementation of a process that detects objects using a sensor suite.

Referring now to FIG. 5, illustrated are diagrams of an implementation 500 of a process that detects objects using a sensor suite. In some embodiments, implementation 500 includes an autonomous system (e.g., autonomous system 202 of FIG. 2) including cameras 504a, radar sensors 504c (e.g., cameras 202a, radar sensors 202c of FIG. 2) and an AV compute 502 (e.g., AV compute 202f). In some embodiments, data generated by cameras 504a and radar sensors 504c is obtained by the device 300 of FIG. 3 to detect objects near an AV.

In the implementation 500, the AV compute 502 (e.g., AV compute 202f of FIG. 2) includes a perception system 506 (e.g., perception system 402 of FIG. 4), a planning system 510 (e.g., planning system 404 of FIG. 4) and a control system 514 (e.g., control system 408 of FIG. 4). The perception system 506 obtains radar data output by at least one radar sensor 504c, the radar data associated with (e.g., representing) one or more physical objects within a field of view of the at least one radar sensor 504c. In examples, the radar sensor is a four dimensional (4D) radar sensor with range, azimuth, elevation and Doppler dimensions. The radar sensor includes, for example, millimeter wave (mm-Wave) sensors that operate at a range of frequencies, such as 60-64 GHz and 76-81 GHz frequencies. In examples, a 4D radar sensor uses multiple-input, multiple-output antenna array systems to capture a high-resolution data corresponding to the environment.

The perception system 506 classifies at least one physical object based on one or more groupings of physical objects (e.g., bicycles, vehicles, traffic signs, pedestrians, and/or the like). In some embodiments, perception system 506 transmits data associated with the classification of the physical objects, e.g., classified objects 508, to planning system 510. In some examples, the perception system 506 also receives image data captured by at least one camera 504a, the image associated with (e.g., representing) one or more physical objects within a field of view of the at least one camera 504a. The image data captured by at least one camera 504a is fused with the radar data output by at least one radar sensor 504c, and the fused data associated with (e.g., representing) one or more physical objects is provided to the perception system 506 for object classification.

The planning system 510 determines a trajectory (512) for the AV to navigate. For example, the planning system 510 periodically or continuously receives data from a perception system 506 (e.g., perception system 402 of FIG. 4) including classified objects 508 in the environment (e.g., environment 100 of FIG. 1). The planning system 510 determines at least one trajectory 512 based on the classified objects 508 generated by perception system 402. The trajectory 512 is transmitted to a control system 514 that controls operation of the AV.

In some embodiments, the radar data is represented as a 1D Range heat map tensor, a 2D Range-Doppler (RD) heat map tensor (also referred to as "RD spectrum"), a 2D Range-Azimuth (RA) heat map tensor (also referred to as "RA spectrum"), or a three-dimensional (3D) Range-Azimuth-Doppler (RAD) matrix tensor (also referred to as "RAD spectrum"). At least one of the radar data representations is input to a machine learning model to detect objects, and the machine learning model outputs a classification of detected objects. In examples, the machine learning model is implemented by the radar sensor 504c, the perception system 506, or any combinations thereof. In examples, the machine learning model is implemented by a device separate from the radar sensor 504c or the perception system 506. In an example, the machine learning model is implemented on a controller (e.g., a domain controller) or a device of an AV (e.g., at least one device of a system of vehicles 102 of FIG. 1), or a device of the autonomous vehicle compute 502. Additionally, in an example, the device separate from the radar sensor 504c and the perception system 506 is a customized hard-wired logic, an application-specific integrated circuit (ASIC), a digital signal processor (DSP), a complex programmable logic device (CPLD), a field programmable gate array (FPGA), or firmware and/or program logic, which in combination with the computer system (e.g., device 300) causes or programs computer system (e.g., device 300) to be a special-purpose machine.

In some embodiments, one of the radar data representations is fused with camera images from the cameras 504a, and the fused data is input to the machine learning model for object detection and classification. In examples, the machine learning model outputs a classification of detected objects. The machine learning model can also be implemented by a device separate from the radar sensor 504c and the perception system 506. For example, the machine learning model is implemented by a controller (e.g., domain controller), a device of an AV (e.g., at least one device of a system of vehicles 102 of FIG. 1), or a device of the autonomous vehicle compute 502.

Figure 6:
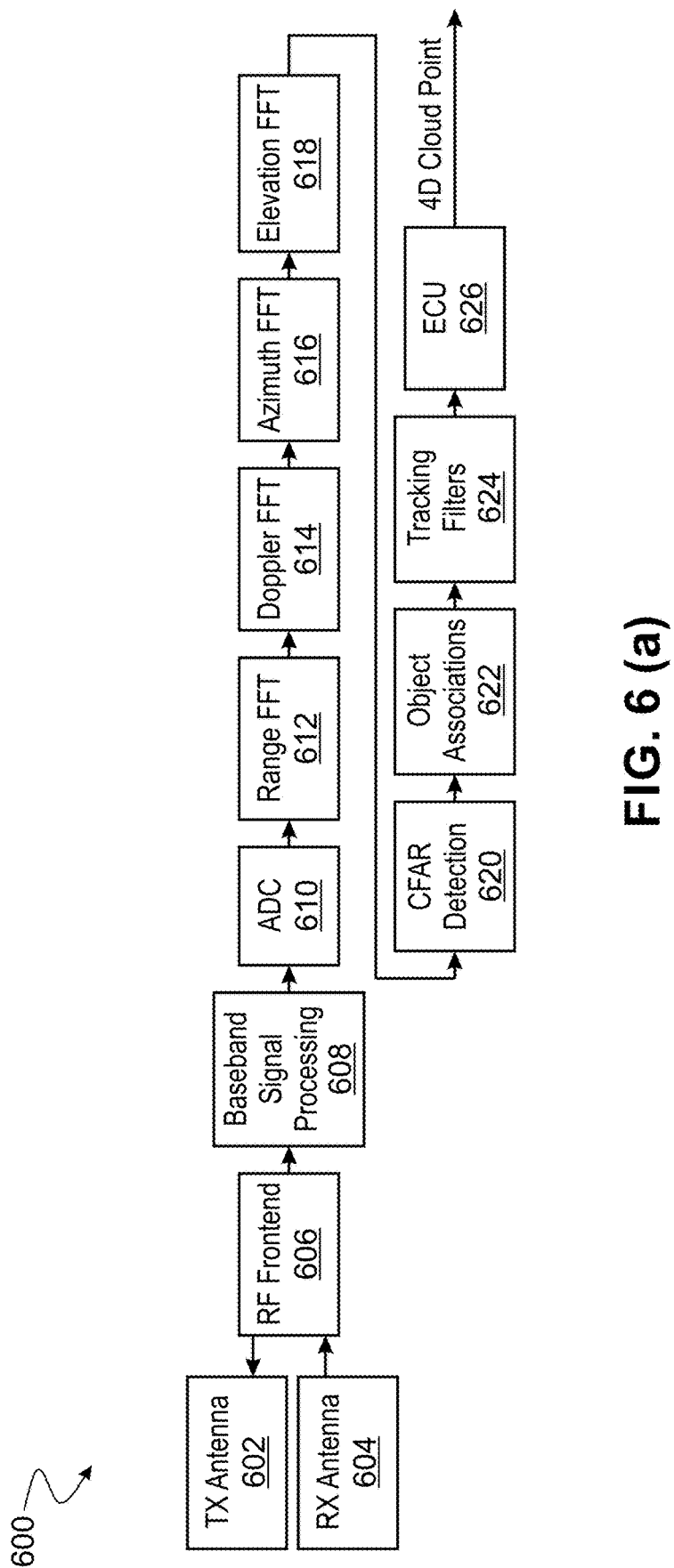
FIGS. 6 (*a*)-(*c*) are different example pipelines of a radar sensor.
Figure 6:
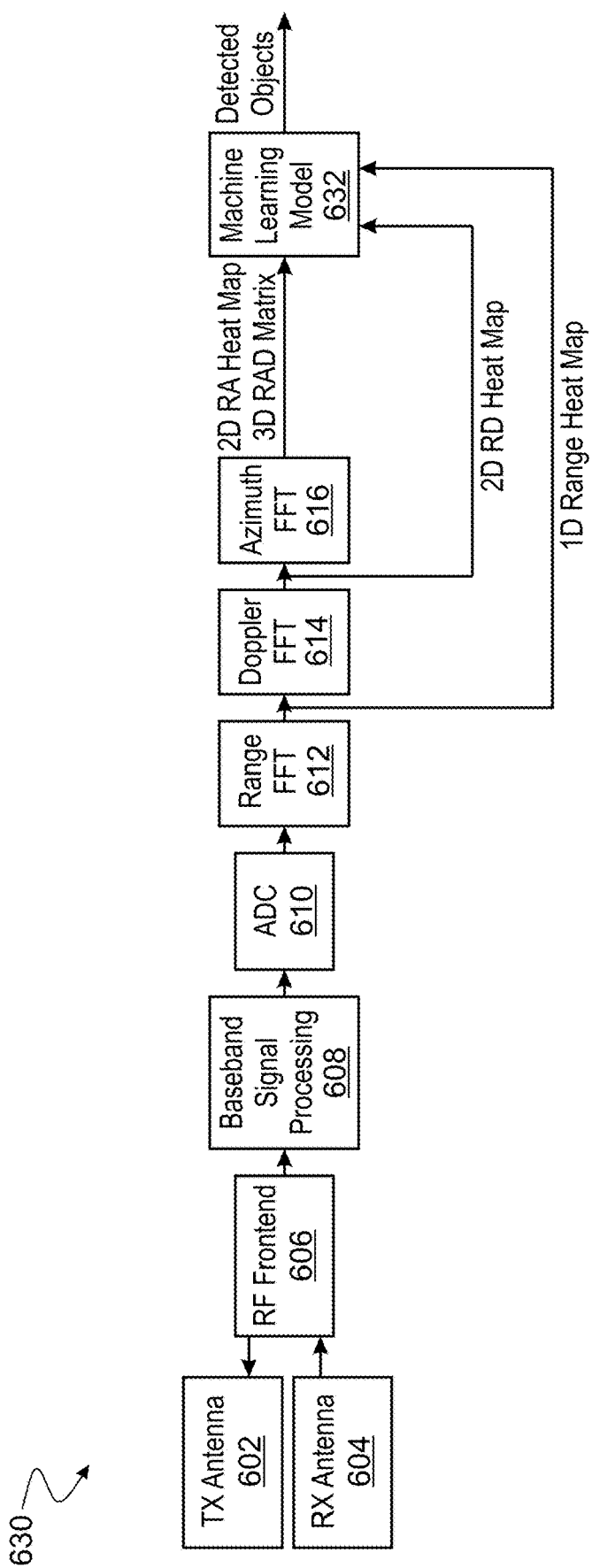
Figure 6:
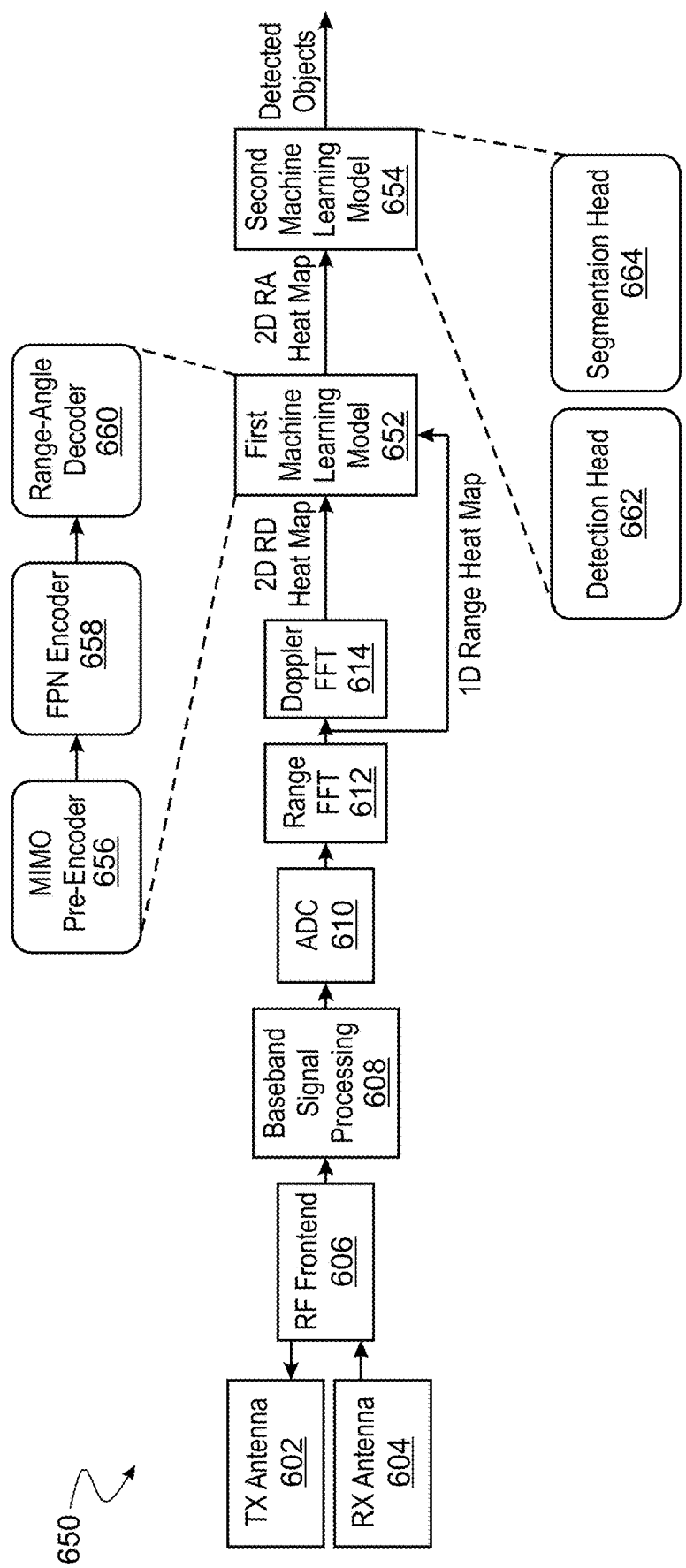

FIG. 6 (a) is an example pipeline 600 implemented by a radar sensor. In some embodiments, one or more of the steps of pipeline 600 are performed (e.g., completely, partially, and/or the like) by devices or systems (or groups of devices and/or systems) that are separate from, or include, an autonomous system. For example, one or more steps of pipeline 600 is performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or radar sensors 504c of FIG. 5. In some embodiments, the steps of pipeline 600 are performed between any of the above-noted systems in cooperation with one another.

Transmitter (Tx) antenna 602 is an antenna for radiating pulse waves generated by a transmitter of a radar sensor as a beam in a predetermined direction. Receiver (Rx) antenna 604 is an antenna for receiving radio waves reflected by an object detected by the radar sensor. The radar sensor includes a radio frequency (RF) front end 606 that receives and demodulates radio waves received from the Rx antenna 604 and generates a baseband signal. The baseband signal is further processed by the base band signal processing chain 608, which includes one or more filters for removing signals in undesired side bands and image frequencies, and one or more amplifiers. The analog signal output from the base band signal processing chain 608 is obtained by an analog-to-digital converter (ADC) 610. The digital signal output by the ADC 610 is raw data (e.g., recorded directly from the reflected waves captured by the radar sensor) sampled at a high data rate. A range FFT 612 is performed on the ADC output data (the digital signal) to extract range data from the ADC output data. A Doppler FFT 614 is performed on the ADC output data to extract velocity data from the ADC output data. An azimuth FFT 616 is performed on the ADC output data to extract angle data from the ADC output data.

An elevation FFT 618 is performed on the ADC output data to extract elevation data from the ADC output data. The ADC output data may include noise and clutter that may give rise to false detections of objects. To remove noise and clutter, signal processing is performed on the ADC output data. In some embodiments, a constant false alarm rate (CFAR) detection algorithm 620 is applied to achieve a probability of false alarm below a predetermined threshold. In examples, the CFAR detection algorithm 620 is an adaptive algorithm used in radar systems to detect target returns against a background of noise, clutter and interference. Object associations 622 are performed to track objects and their movements. Object associations 622 associate a group of points to an object according to each point's position and velocity, and then track the movement of the object as a whole. Tracking filters 624 are applied to improve the estimate of the track position of the objects as well as to revise the errors in the former prediction. Tracking filters 624 include, for example, an Alpha-Beta tracker and a Kalman filter. The filtered data is obtained by electronic control units (ECU) 626 for processing radar sensor data to trigger key advanced driver assistance systems (ADAS) features. The output from the ECU 626 is 4D radar data, including 3D point cloud and velocity of the surrounding objects around the AV.

FIG. 6 (b) is another example pipeline 630 implemented by a radar sensor. In some embodiments, one or more of the steps of pipeline 630 are performed (e.g., completely, partially, and/or the like) by devices or systems (or groups of devices and/or systems) that are separate from, or include, an autonomous system. For example, one or more steps of pipeline 630 is performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or radar sensors 504c of FIG. 5. In some embodiments, the steps of pipeline 630 are performed between any of the above-noted systems in cooperation with one another.

Similar to FIG. 6 (a), FIG. 6 (b) shows a Tx antenna 602, Rx antenna 604, RF front end 606, base band signal processing chain 608, ADC 610, range FFT block 612, Doppler FFT block 614, and azimuth FFT block 616. Instead of 4D radar data output in FIG. 6 (a), the output of FIG. 6 (b) is one of four tensors (1D range heat map tensor, 2D RD heat map tensor, 2D RD heat map tensor, 3D RAD matrix tensor). In some embodiments, the range data output from the range FFT block 612 can form a 1D range heat map tensor, which is input to machine learning model 632. In these embodiments, the machine learning model 632 for detecting objects replaces all the blocks from Doppler FFT 614 to ECU 626 of FIG. 6 (a). In some embodiments, the range data output from the range FFT block 612 is combined with the velocity data output from the Doppler FFT block 614 to form a 2D RD heat map tensor, which is input to machine learning model 632. In these embodiments, the machine learning model 632 for detecting objects replaces all the blocks from Azimuth FFT 616 to ECU 626 of FIG. 6 (a). In some embodiments, the range data output from the range FFT block 612 is combined with the angle data output from the azimuth FFT block 616 to form a 2D RA heat map tensor, which is input to machine learning model 632. In these embodiments, the machine learning model 632 for detecting objects replaces the block Doppler FFT 614 and all the blocks from elevation FFT 618 to ECU 626 of FIG. 6 (a). In some embodiments, the range data output from the range FFT block 612 and the velocity data output from the Doppler FFT block 614 are combined with the angle data output from the azimuth FFT block 616 to form a 3D RAD matrix tensor, which is input to machine learning model 632. In these embodiments, the machine learning model 632 for detecting objects replaces all the blocks from elevation FFT 618 to ECU 626 of FIG. 6 (*a*). The machine learning model 632 is configured to detect objects, and is different (e.g., including different layers) for each of four tensors (1D range heat map tensor, 2D RD heat map tensor, 2D RD heat map tensor, 3D RAD matrix tensor).

In some embodiments, the example pipeline 630 can also include elevation FFT block 618 as the pipeline 600 of FIG. 6 (*a*). The machine learning model 632 for detecting objects replaces all the blocks from CFAR detection 620 to ECU 626 of FIG. 6 (*a*). The elevation FFT block 618 can be placed between the azimuth FFT block 616 and the machine learning model 632. Compared with angle data from the azimuth FFT block 616, the elevation data from the elevation FFT block 618 carries much less information, because the measurement range and resolution of elevation data are much lower than angle data.

One of the 1D range heat map tensor, the 2D RD heat map tensor, the 2D RA heat map tensor, and the 3D RAD matrix tensor is provided to the machine learning model 632 (the machine learning model 632 is a different model for each tensor). The 1D range heat map tensor, the 2D RD heat map tensor, the 2D RA heat map tensor, or the 3D RAD matrix tensor are different representations of the radar data. The range data, the velocity data, and the angle data are directly extracted from ADC 610 raw data, without performing signal processing including CFAR detection 620, object associations 622, and tracking filters 624. Even though the signal processing can remove noise and clutter, signal processing (e.g., CFAR detection algorithm 620) may also mistakenly remove useful data which is not noise or clutter. The 1D range heat map tensor, the 2D RD heat map tensor, the 2D RA heat map tensor, or the 3D RAD matrix tensor includes more rich data when compared to the 4D radar data output from ECU 626 of FIG. 6 (*a*).

In some embodiments, the machine learning model 632 for detecting and/or classifying objects is implemented by the radar sensor (e.g., radar sensor 202*c* of FIG. 2 or radar sensor 504*c* of FIG. 5). In some embodiments, the machine learning model 632 is implemented by the perception system (e.g., perception system 402 of FIG. 4 or perception system 506 of FIG. 5). In some embodiments, the machine learning model 632 is implemented by a device separate from the radar sensor and the perception system 506. For example, the machine learning model 632 is implemented on a controller (e.g., a domain controller) or a computer (e.g., device 300 of FIG. 3, AVC 202*f* of FIG. 2, AVC 400 of FIG. 4, or AVC 502 of FIG. 5) in the AV. In some embodiments, the machine learning model 632 is any deep learning model for detecting objects, e.g., convolutional neural network (CNN), feature pyramid network (FPN), etc. One of the tensors that represent the radar data is input to the machine learning model 632, and the machine learning model outputs detected objects. In examples, the detected objects are identified by a bounding box around each object of interest in a frame of radar data and a classification label.

FIG. 6 (*c*) is another example pipeline 650 of a radar sensor. In some embodiments, one or more of the steps of pipeline 650 are performed (e.g., completely, partially, and/or or the like) by devices or systems (or groups of devices and/or systems) that are separate from, or include, an autonomous system. For example, one or more steps of pipeline 650 is performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or radar sensors 504*c* of FIG. 5. In some embodiments, the steps of pipeline 650 are performed between any of the above-noted systems in cooperation with one another.

Figure 9:
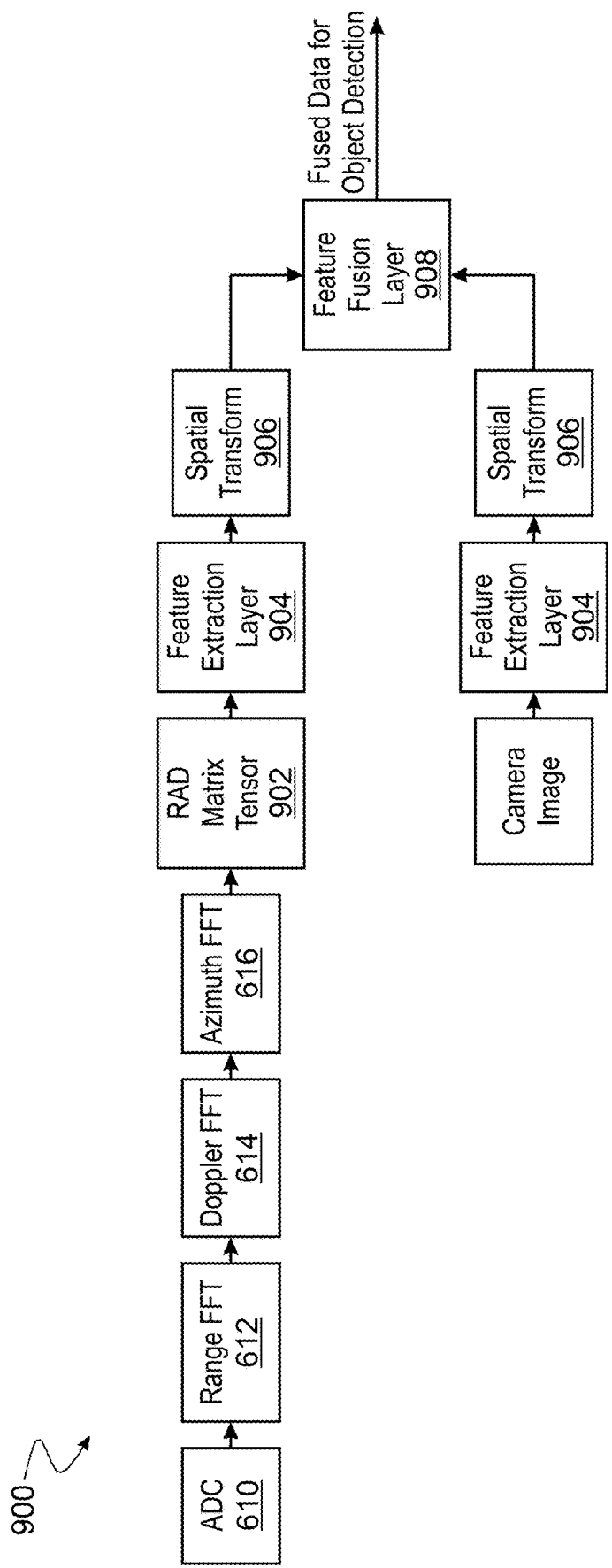
FIGS. 9 (*a*)-(*c*) are different example pipelines of sensor data fusion.
Figure 9:
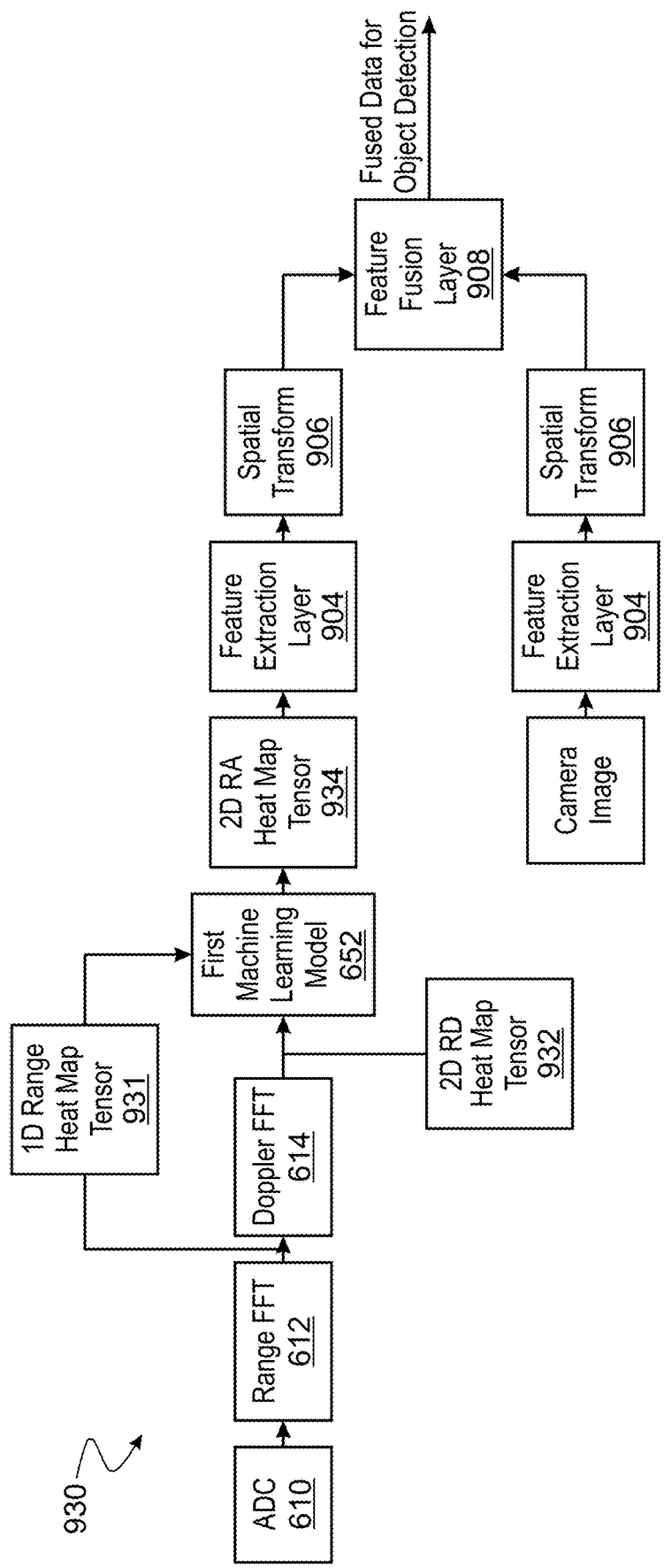
Figure 9:
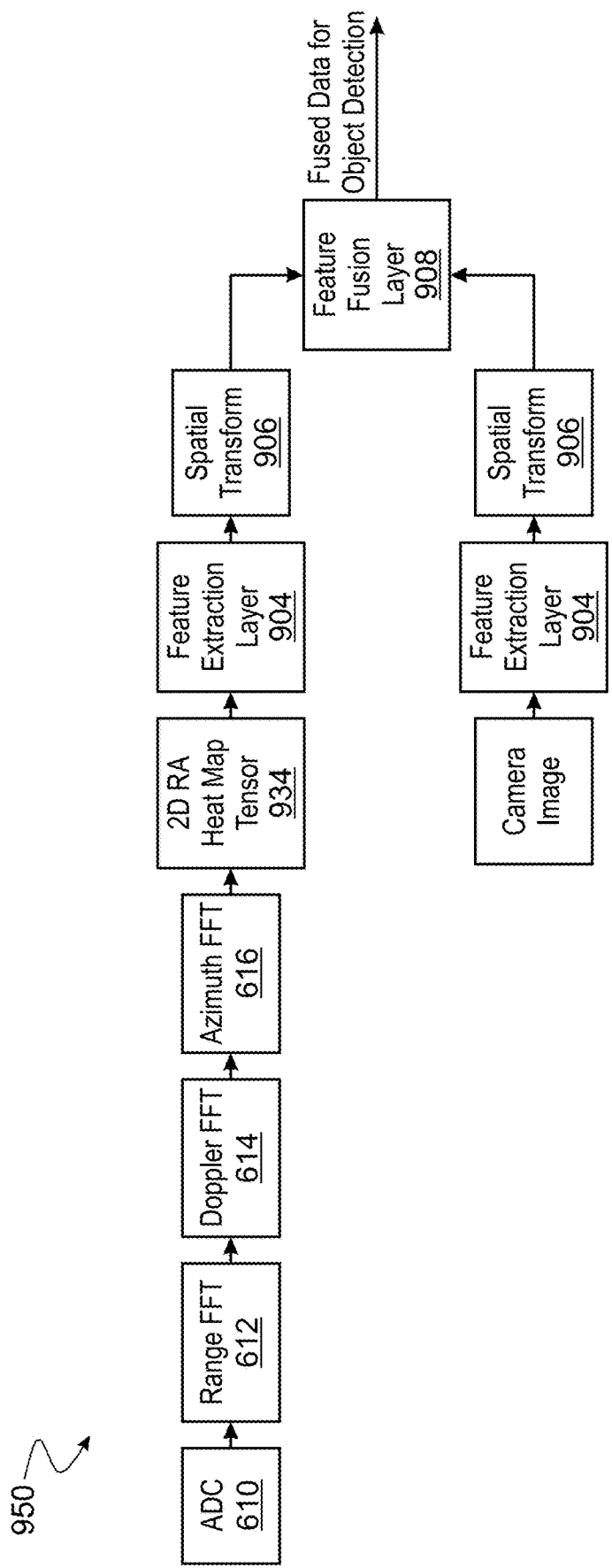

The example pipeline 650 of an example radar sensor does not include azimuth FFT block 616 of FIGS. 6 (*a*) and 6(*b*). Thus, the output of the example radar sensor is a 2D RD heat map. However, to implement feature fusion as illustrated in FIGS. 9 (*a*)-9 (*c*), angle data is required. A 2D RD heat map tensor can be provided to a first machine learning model 652 to obtain a 2D RA heat map including the angle data. In the example of FIG. 6 (*c*), a 2D RD heat map tensor is generated as a combination of range data from range FFT 612 and velocity data from Doppler FFT 614. In examples, as shown in FIG. 6 (*c*), a first radar data representation (e.g., 2D RD heat map tensor) is input to the first machine learning model 652, and the first machine learning model 652 outputs a second radar data representation (e.g., 2D RA heat map). The second radar data representation (e.g., 2D RA heat map) is input to a second machine learning model 654, and the second machine learning model outputs a location (e.g., a bounding box) and classification of objects detected in the radar data. In the example of FIG. 6 (*c*), the 2D RD heat map tensor is provided to a first machine learning model 652 to obtain 2D RA heat map tensor, which is provided to a second machine learning model 654 to detect objects surrounding the AV.

In examples, as shown in FIG. 6 (*c*), a first radar data representation (e.g., 1D Range heat map tensor) is input to the first machine learning model 652, and the first machine learning model 652 outputs a second radar data representation (e.g., 2D RA heat map). The first machine learning model 652 is different (e.g., including different layers) depending on the input (1D Range heat map tensor or 2D RD heat map tensor).

In some embodiments, the first machine learning model 652 includes an encoder/decoder neural network architecture. For example, the first machine learning model 652 includes multiple-input multiple-output (MIMO) pre-encoder 656, FPN encoder 658, and range-angle decoder 660. The MIMO pre-encoder 656 reorganizes and compresses the 2D RD heat map tensor, to facilitate subsequent exploitation of the MIMO information (to recover angles) while keeping data volume under control. The MIMO pre-encoder 656 learns how to combine input channels (the quantity of receiver antennas) and compresses radar data.

The FPN encoder 658 uses a pyramidal structure to learn multi-scale features. In an embodiment, the FPN encoder 658 includes four Resnet blocks (RNB) composed of 3, 6, 6, and 3 residual layers respectively. The feature maps of these residual layers form a feature pyramid. Channel dimensions are chosen to encode an azimuth angle over the entire distance range (i.e., high resolution and narrow field of view at a far range, low resolution and wider field of view at a near range). To prevent a loss of radar data for small objects (typically few pixels in the RD heat map tensor), the FPN encoder 658 performs e.g., 2×2 downsampling per Resnet block, leading to a total reduction of the tensor size by a factor of 16 in height and width. The FPN encoder 658 uses, e.g., 3×3 convolution kernels.

The range-angle decoder 660 expands the input FPN feature maps to higher-resolution representations. The dimensions of the tensor provided to the range-angle decoder 660 correspond respectively to range, Doppler, and azimuth angle, whereas the feature maps correspond to a range-azimuth representation. Consequently, the Doppler and azimuth axes are swapped to match the final axis ordering, and the feature maps are then upscaled. A basic block (BB) of two Conv-BatchNorm-ReLU layers is also applied in the range-angle decoder 660 to generate the range-azimuth heat map tensor.

In some embodiments, the second machine learning model 654 includes detection head 662 for localizing vehicles in range-azimuth coordinates, and segmentation head 664 for predicting the free driving space. The detection head 662 processes the inputted RA heat map tensor using a first common sequence of four Conv-BatchNorm blocks (CB) with, e.g., 144, 96, 96, and 96 filters, respectively. In examples, the terms backbone and head refer to the structure of the second machine learning model 654. In examples, a backbone extracts features from data and one or more heads performs a predetermined task using the features. In some embodiments, a segmentation head outputs a mask for each pixel that indicates whether an object is present or not present. Additionally, in some embodiments, the detection head includes a classification head and bounding box regression head. The detection head outputs a classification and bounding box for each object in the radar data.

The classification head includes a convolution layer with sigmoid activation that predicts a probability map. The output of the classification head is a binary classification of each "pixel" as occupied by an object or not occupied by an object. The regression head finely predicts the range and azimuth values corresponding to the detected object. The regression head applies a 3×3 convolution layer to output two feature maps corresponding to the final range and azimuth values.

The segmentation head 664 is formulated as a pixel-level binary classification. The segmentation mask has, e.g., a resolution of 0.4 m in range and 0.2° in azimuth. It corresponds to half of the native range and azimuth resolutions while considering only half of the entire azimuth field of review (FoV) (within [−45°, 45°]). The RA heat map tensor is processed by two consecutive groups of two Conv-BatchNorm-ReLu blocks (BB), producing respectively 128 and 64 feature maps. A final 1×1 convolution block is applied to output a 2D feature map, followed by a sigmoid activation to estimate the probability of each location being drivable.

Figure 7:
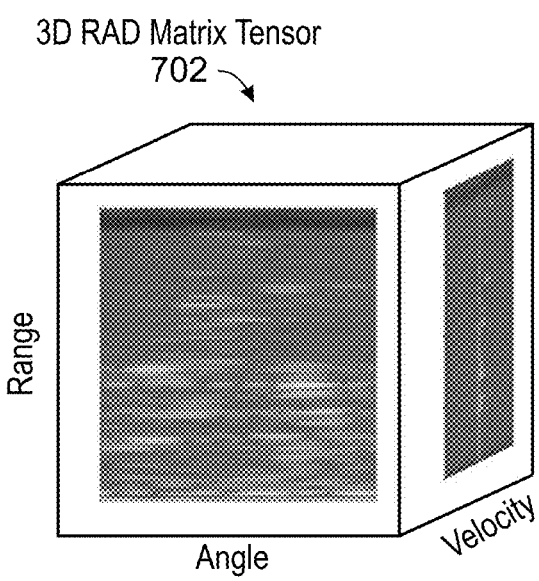
FIGS. 7 (*a*)-(*d*) are different example representations of radar data.
Figure 7:
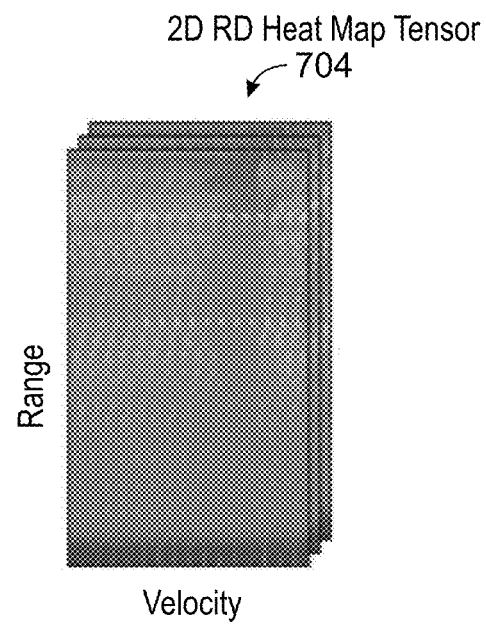
Figure 7:
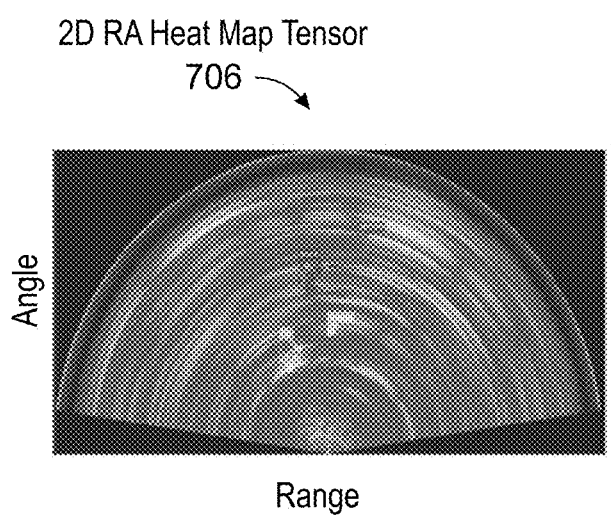
Figure 7:
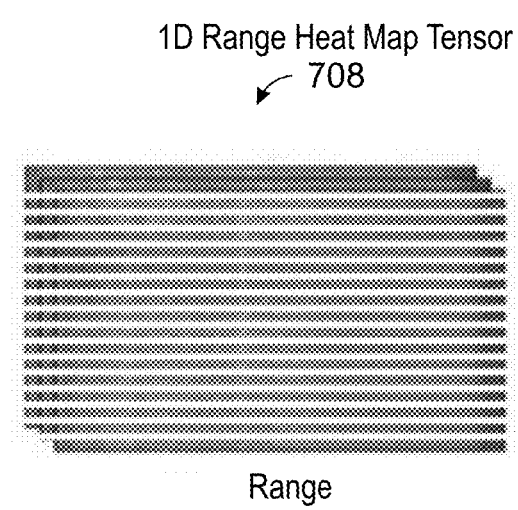

FIGS. 7 (a)-(d) are different example representations of radar data. The 3D RAD matrix tensor 702 includes a combination of range data from range FFT block 612 of FIGS. 6 (a)-(c), velocity data from Doppler FFT block 614 of FIGS. 6 (a)-(c), and angle data from azimuth FFT block 616 of FIGS. 6 (a)-(b). The 2D RD heat map tensor 704 includes a combination of range data from range FFT block 612 of FIGS. 6 (a)-(c) and velocity data from Doppler FFT block 614 of FIGS. 6 (a)-(c). The 2D RA heat map tensor 706 includes a combination of range data from range FFT block 612 of FIGS. 6 (a)-(c) and angle data from azimuth FFT block 616 of FIGS. 6 (a)-(b). The 1D Range heat map tensor 708 includes range data from range FFT block 612 of FIGS. 6 (a)-(c).

Figure 8:
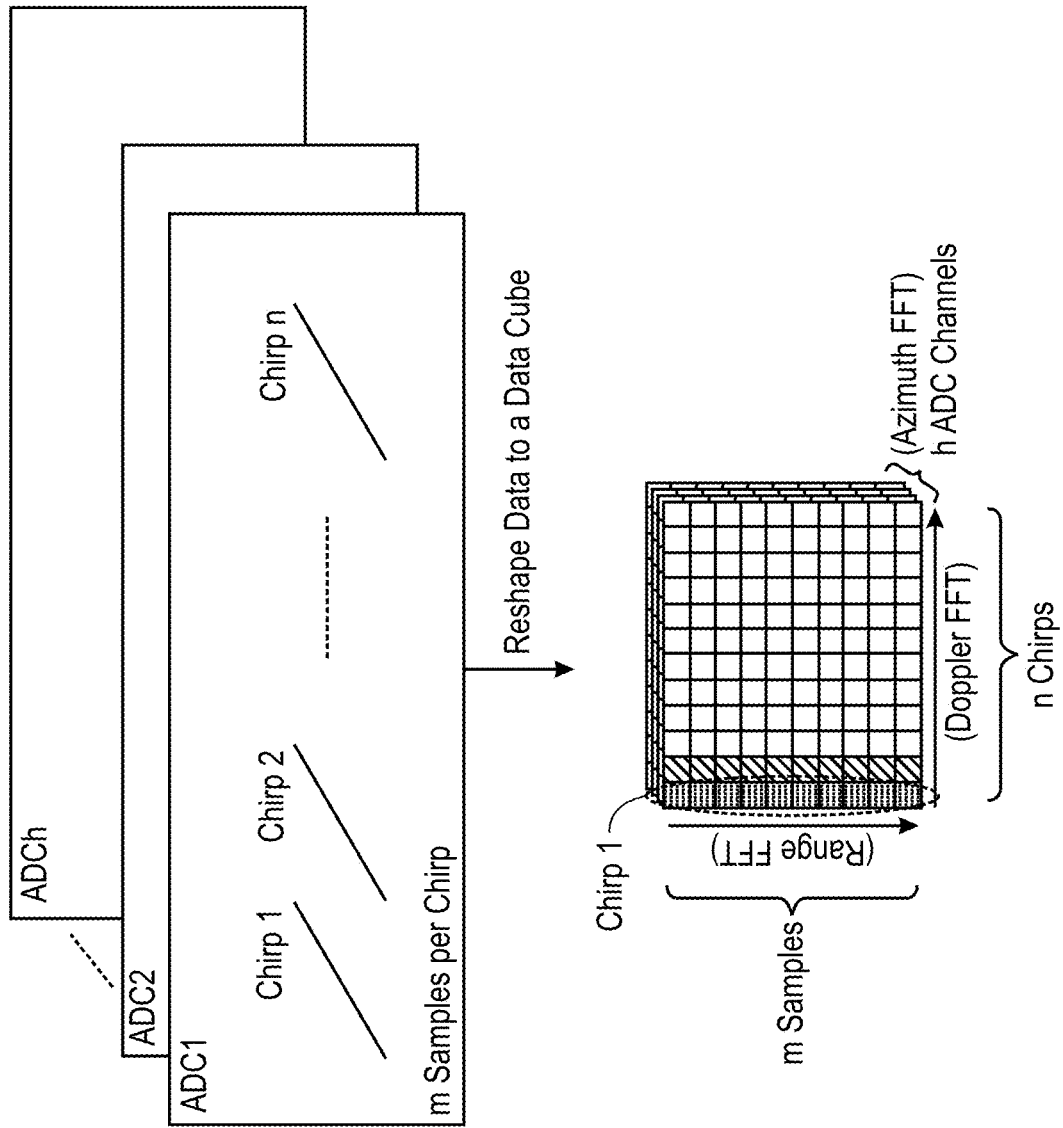
FIG. 8 is a diagram illustrating generation of an example Range-Azimuth-Doppler (RAD) matrix tensor representing radar data.

FIG. 8 is a diagram illustrating generation of an example 3D RAD matrix tensor representing radar data. In examples, the radar sensor transmits chirps, and each chirp is a frequency swept signal. The frequency of a radar signal is sweeping (or modulating) from low to high or from high to low over time. In an example, a chirp signal is a continuous sinusoidal waveform with its frequency changed from a particular frequency (e.g., 77 Ghz) by a few hundred megahertz for the entire chirp. As shown in FIG. 8, the quantity of samples per chirp is m, the quantity of chirps (sweep signals) per frame is n, and the quantity of ADC channels (the same as the quantity of radar receivers) is h. The example 3D RAD matrix tensor (a radar data cube) is generated to represent these data. The size of the radar data cube is m×n×h. In some embodiments, the values of m, n, and h are configurable, so that the size of the radar data cube is changed. The quantity of samples per chirp (the quantity of samples obtained in a period of a chirp) m is represented by range data from range FFT block 612 of FIGS. 6 (a)-(c); the quantity of chirps per frame n is represented by velocity data from Doppler FFT block 614 of FIGS. 6 (a)-(c); and the quantity of ADC channels h is represented by angle data from azimuth FFT block 616 of FIGS. 6 (a)-(b). In some embodiments, the size of the radar data cube is configurable based on measuring parameters, e.g., sensing range (the maximum distance range), distance resolution, the maximum velocity, velocity resolution, and angular resolution. The maximum velocity is related to the period of the chirp, and can be represented with Equation (1): $V_{max}=\lambda/(4T_c)$, wherein $\lambda$ is the wavelength of electromagnetic wave signals, and $T_c$ is the period of the chirp. The velocity resolution is related to the period of the frame and can be represented with Equation (2): $V_{res}=\lambda/(2T_f)$, wherein $\lambda$ is the wavelength of electromagnetic wave signals, and $T_f$ is the period of the frame. The distance resolution is related to the bandwidth of the chirp, and can be represented with Equation (3): $d_{res}=C/(2B)$, wherein C is speed of light, and B is the bandwidth of the chirp. The maximum distance range is related to the bandwidth of the chirp and the period of the chirp, and can be represented with Equation (4): $d_{max}=CF_{IFmax}/(2S)$, wherein C is speed of light, $F_{IFmax}$ is the maximum intermediate frequency, $S=B/T_c$ (wherein B is the bandwidth of the chirp and $T_c$ is the period of the chirp). The period of the chirp $T_c$ and the sampling rate determine the value of m. The period of the chirp $T_c$ and the period of the frame $T_f$ determine the value of n. The angular resolution is related to the quantity of ADC channels or the quantity of receivers and determines the value of h.

Similarly, the size of 2D RD heat map tensor is m×n, and the size of 2D RA heat map tensor is m×h, the size of 1D range heat map tensor is m. The size of radar data cube, 2D RD heat map tensor, the 2D RA heat map tensor, or 1D range heat map tensor is configurable according to different radar sensors. For example, fewer ADC channels are required for a short-range radar, and thus the value of h is smaller. For another example, lower distance resolution (i.e., higher distance resolution value $d_{res}$) is required for a long-range radar, hence resulting in a lower bandwidth (according to Equation (3)) and higher distance range (according to Equation (4)). In an embodiment, the period of the chirp $T_c$ is slightly increased in combination with a lower bandwidth to obtain an even higher distance range (according to Equation (4)). Accordingly, the value of m is greater due to the increased period of the chirp $T_c$.

FIG. 9 (a) is an example pipeline 900 of sensor data fusion. In some embodiments, one or more of the steps of pipeline 900 are performed (e.g., completely, partially, and/or the like) by devices or systems (or groups of devices and/or systems) that are separate from, or include, an autonomous system. For example, one or more steps of pipeline 900 is performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or radar sensors 504c of FIG. 5. In some embodiments, the steps of pipeline 900 are performed between any of the above-noted systems in cooperation with one another.

Referring to FIG. 9 (a) and FIG. 6 (b), range FFT 612, Doppler FFT 614, and azimuth FFT 616 are performed on ADC raw data 610 of a radar sensor to obtain a 3D RAD matrix tensor 902 representing radar data. The radar data is fused with camera images captured by cameras (e.g., cameras 202a of FIG. 2 or cameras 504a of FIG. 5) for improved object detection.

The RAD matrix tensor 902 is provided to feature extraction layer 904 which extracts features from radar data. Spatial transformation, e.g., polar to Cartesian transformation, is performed by spatial transformer 906 on extracted radar features.

Similarly, camera images are provided to feature extraction layer 904 which extracts features from images. Spatial transformation, e.g., homography transformation, is performed by spatial transformer 906 to transform camera images into the Cartesian space. To compute this projection mapping, cameras (e.g., cameras 202a of FIG. 2 or cameras 504a of FIG. 5) are assumed to be imaging a planar scene (i.e., the radar plane, which is approximately parallel to a road plane). The intrinsic and extrinsic calibration information is then utilized to project a set of points in the Cartesian radar plane to image coordinates. A planar homography transformation is then performed, using, e.g., a standard 4-point algorithm. If calibration information is unavailable, it is also possible to manually assign multiple tie points, finally solving for the best homography using a least squares method. After the homography transformation, the image coordinates match the Cartesian radar image coordinates if the planar assumption is correct and the cameras do not move with respect to the radar sensor.

The output from the branch of RAD matrix tensor 902 and the output from the branch of camera images are provided to feature fusion layers 908 to combine features across both branches. Features from both branches are concatenated to form a unified feature map. The fused data or the unified feature map is provided to additional layers for object detection.

FIG. 9 (b) is another example pipeline 930 of sensor data fusion. In some embodiments, one or more of the steps of pipeline 930 are performed (e.g., completely, partially, and/or the like) by devices or systems (or groups of devices and/or systems) that are separate from, or include, an autonomous system. For example, one or more steps of pipeline 930 is performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or radar sensors 504c of FIG. 5. In some embodiments, the steps of pipeline 930 are performed between any of the above-noted systems in cooperation with one another.

Compared to the example pipeline 900 of FIG. 9 (a), the example pipeline 930 does not include azimuth FFT block 616. 2D RD heat map tensor 932 is generated as a combination of range data from range FFT 612 and velocity data from Doppler FFT 614. The 2D RD heat map tensor 932 is provided to a first machine learning model 652 (e.g., first machine learning model 652 of FIG. 6 (c)) to obtain 2D RA heat map tensor 934. Similarly to the example pipeline 900 of FIG. 9 (a), camera images and the 2D RA heat map tensor 934 are then fused for object detection.

In some embodiments, 1D range heat map tensor 931 is provided to a first machine learning model 652 to obtain 2D RA heat map tensor 934. The first machine learning model 652 is different (e.g., including different layers) depending on the input (1D range heat map tensor 931 or 2D RD heat map tensor 932).

FIG. 9 (c) is another example pipeline 950 of sensor data fusion. In some embodiments, one or more of the steps of pipeline 950 are performed (e.g., completely, partially, and/or the like) by devices or systems (or groups of devices and/or systems) that are separate from, or include, an autonomous system. For example, one or more steps of pipeline 950 is performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or radar sensors 504c of FIG. 5. In some embodiments, the steps of pipeline 950 are performed between any of the above-noted systems in cooperation with one another.

As shown in FIG. 9 (c), 2D RA heat map tensor 934 is generated as a combination of range data from range FFT 612 and angle data from azimuth FFT 616. Similarly to the example pipeline 900 of FIG. 9 (a) and the example pipeline 930 of FIG. 9 (b), camera images and the 2D RA heat map tensor 934 are then fused for object detection.

Figure 10:
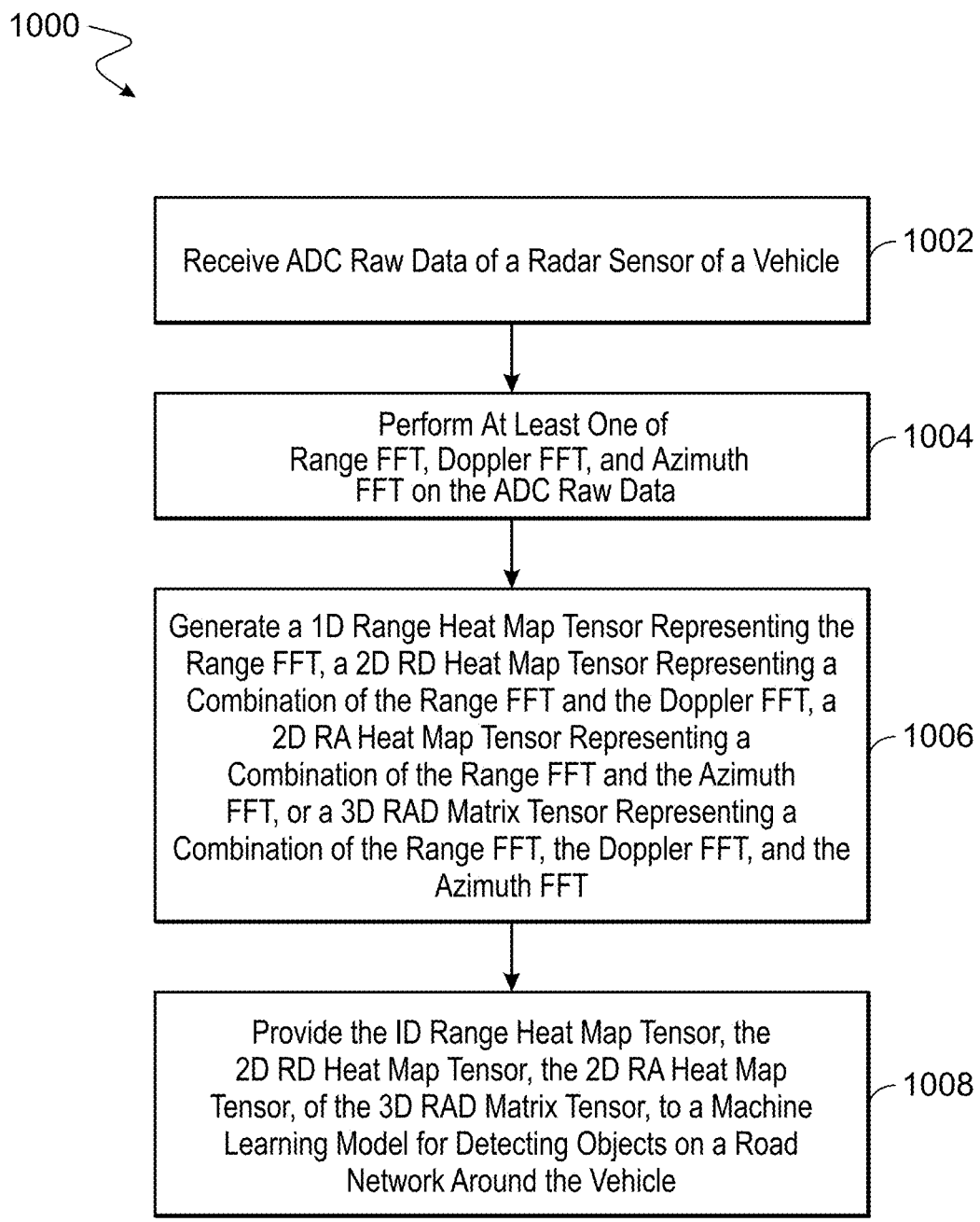
FIG. 10 is an example flow chart of a process for generation of representations of radar data.

FIG. 10 is an example flow chart of a process 1000 for generation of representations of radar data. In some embodiments, one or more of the steps of pipeline 1000 are performed (e.g., completely, partially, and/or the like) by devices or systems (or groups of devices and/or systems) that are separate from, or include, an autonomous system. For example, one or more steps of pipeline 1000 is performed (e.g., completely, partially, and/or the like) by remote AV system 114 of FIG. 1, vehicle 102 of FIG. 1 or vehicle 200 of FIG. 2 (e.g., autonomous system 202 of vehicle 102 or 200), device 300 of FIG. 3, and/or radar sensors 504c of FIG. 5. In some embodiments, the steps of pipeline 1000 are performed between any of the above-noted systems in cooperation with one another.

In some embodiments, at block 1002, a processor (e.g., the processor 304 of FIG. 3, or a processor of a radar sensor 202c of FIG. 2 or a radar sensor 504c of FIG. 5) receives ADC raw data (ADC raw data 610 of FIGS. 6 (a)-(c)) of a radar sensor (a radar sensor 202c of FIG. 2 or a radar sensor 504c of FIG. 5) of a vehicle.

At block 1004, the processor performs range FFT (range FFT 612 of FIGS. 6 (a)-(c)), Doppler FFT (Doppler FFT 614 of FIGS. 6 (a)-(c)), and azimuth FFT (azimuth FFT 616 of FIGS. 6 (a)-(b)) on the ADC raw data. Range data is extracted from the ADC raw data by performing the range FFT. Velocity data is extracted from the ADC raw data by performing the Doppler FFT. Angle data is extracted from the ADC raw data by performing the azimuth FFT.

At block 1006, the processor generates a one-dimensional (1D) range heat map tensor representing the range FFT, a 2D range-Doppler (RD) heat map tensor representing a combination of the range FFT and the Doppler FFT, a 2D RA heat map tensor representing a combination of the range FFT and the azimuth FFT, or a 3D RAD matrix tensor representing a combination of the range FFT, the Doppler FFT, and the azimuth FFT. The processor generates at least one of the four radar data representations.

At block 1008, the processor provides the 1D range heat map tensor, the 2D RD heat map tensor, the 2D RA heat map tensor, or the 3D RAD matrix tensor, to a machine learning model for detecting objects on a road network around the vehicle. At least one of the four radar data representations is provided to a machine learning model for object detection.

The techniques of this disclosure can provide radar data representations, instead of a sparse point cloud, to the machine learning model. The machine learning model detects objects based on rich information in the radar data representations, which are early stage radar data. The radar data representations are not subject to signal processing of ADC raw data that traditional radar sensors usually perform. Without "over-processing" the ADC raw data, the radar data representations contain rich information and are provided in a format compatible with the machine learning model. The radar data representations is used to train the machine learning model for detecting objects.

According to some non-limiting embodiments or examples, provided is a method, comprising: receiving analog-to-digital converter (ADC) raw data of a radar sensor of a vehicle. The method comprises performing range fast Fourier transform (FFT), Doppler FFT, and azimuth FFT on the ADC raw data. The method comprises generating a 2D range-Doppler (RD) heat map tensor representing a combination of the range FFT and the Doppler FFT, a 2D range-azimuth (RA) heat map tensor representing a combination of the range FFT and the azimuth FFT, or a 3D range-azimuth-Doppler (RAD) matrix tensor representing a combination of the range FFT, the Doppler FFT, and the azimuth FFT. The method comprises providing at least one of the 1D range heat map tensor, the 2D RD heat map tensor, the 2D RA heat map tensor, or the 3D RAD matrix tensor, to a machine learning model for detecting objects on a road network around the vehicle. Systems and computer program products are also provided.

According to some non-limiting embodiments or examples, provided is a system, comprising at least one processor; and a memory storing instructions thereon that, when executed by the at least one processor, cause the at least one processor to perform operations, comprising: receiving analog-to-digital converter (ADC) raw data of a radar sensor of a vehicle. The operations comprise performing range fast Fourier transform (FFT) and Doppler FFT on the ADC raw data. The operations comprise generating a two-dimensional (2D) range-Doppler (RD) heat map tensor representing a combination of the range FFT and the Doppler FFT. The operations comprise providing the 2D RD heat map tensor to a machine learning model for detecting objects on a road network around the vehicle.

According to some non-limiting embodiments or examples, provided is at least one non-transitory computer-readable medium comprising one or more instructions that, when executed by at least one processor, cause the at least one processor to perform operations, comprising: receiving analog-to-digital converter (ADC) raw data of a radar sensor of a vehicle. The operations comprise performing range fast Fourier transform (FFT), Doppler FFT, and azimuth FFT on the ADC raw data. The operations comprise generating a three-dimensional (3D) range-azimuth-Doppler (RAD) matrix tensor representing a combination of the range FFT, the Doppler FFT, and the azimuth FFT. The operations comprise providing the 3D RAD matrix tensor to a machine learning model for detecting objects on a road network around the vehicle.

Clause 1: A method, comprising: receiving, by at least one processor, analog-to-digital converter (ADC) raw data of a radar sensor of a vehicle; performing, by the at least one processor, at least one of range fast Fourier transform (FFT), Doppler FFT, and azimuth FFT on the ADC raw data; generating, by the at least one processor, a one-dimensional (1D) range heat map tensor representing the range FFT, a two-dimensional (2D) range-Doppler (RD) heat map tensor representing a combination of the range FFT and the Doppler FFT, a 2D range-azimuth (RA) heat map tensor representing a combination of the range FFT and the azimuth FFT, or a three-dimensional (3D) range-azimuth-Doppler (RAD) matrix tensor representing a combination of the range FFT, the Doppler FFT, and the azimuth FFT; and providing, by the at least one processor, at least one of the 1D range heat map tensor, the 2D RD heat map tensor, the 2D RA heat map tensor, or the 3D RAD matrix tensor, to a machine learning model for detecting objects on a road network around the vehicle.

Clause 2: The method of Clause 1, wherein providing the 1D range heat map tensor, the 2D RD heat map tensor, the 2D RA heat map tensor, or the 3D RAD matrix tensor, to the machine learning model further comprises: receiving camera images from a camera of the vehicle; fusing the camera images with the 1D range heat map tensor, the 2D RA heat map tensor or the 3D RAD matrix tensor; and providing the fused data to the machine learning model.

Clause 3: The method of Clause 1 or 2, wherein the 3D RAD matrix tensor includes the azimuth FFT representing the quantity of ADC channels, the Doppler FFT representing the quantity of chirps in each ADC channel, and the range FFT representing the quantity of samples per chirp.

Clause 4: The method of Clause 3, wherein a size of the 3D RAD matrix tensor is configured based on one or more of sensing range, distance resolution, velocity resolution, angular resolution, a bandwidth of the chirp, a period of the chirp, the quantity of samples per chirp or sampling rate, or the quantity of ADC channels.

Clause 5: The method of any one of preceding Clauses, wherein the 2D RD heat map tensor includes the Doppler FFT representing the quantity of chirps in each ADC channel and the range FFT representing the quantity of samples per chirp.

Clause 6: The method of Clause 5, wherein a size of the 2D RD heat map tensor is configured based on one or more of sensing range, distance resolution, velocity resolution, a bandwidth of the chirp, a period of the chirp, the quantity of samples per chirp or a sampling rate.

Clause 7: The method of any one of preceding Clauses, wherein the 2D RA heat map tensor includes the azimuth FFT representing the quantity of ADC channels and the range FFT representing the quantity of samples per chirp.

Clause 8: The method of Clause 7, wherein a size of the 2D RA heat map tensor is configured based on one or more of sensing range, distance resolution, angular resolution, a bandwidth of the chirp, or the quantity of ADC channels.

Clause 9: The method of any one of preceding Clauses, wherein the machine learning model includes a detection head and a segmentation head.

Clause 10: A system, comprising: at least one processor; and a memory storing instructions thereon that, when executed by the at least one processor, cause the at least one processor to perform operations, comprising: receiving analog-to-digital converter (ADC) raw data of a radar sensor of a vehicle; performing range fast Fourier transform (FFT) and Doppler FFT on the ADC raw data; generating a two-dimensional (2D) range-Doppler (RD) heat map tensor representing a combination of the range FFT and the Doppler FFT; and providing the 2D RD heat map tensor to a machine learning model for detecting objects on a road network around the vehicle.

Clause 11: The system of Clause 10, wherein providing the 2D RD heat map tensor to the machine learning model comprises: providing the 2D RD heat map tensor to a first machine learning model to obtain a 2D range-azimuth (RA) heat map tensor; and providing the 2D RA heat map tensor to the machine learning model for detecting objects on the road network around the vehicle.

Clause 12: The system of Clause 11, wherein the first machine learning model includes a pre-encoder, a shared feature pyramidal network (FPN) encoder, and a range-angle decoder.

Clause 13: The system of Clause 11 or 12, wherein the 2D RD heat map tensor includes the Doppler FFT representing the quantity of chirps in each ADC channel and the range FFT representing the quantity of samples per chirp, wherein a size of the 2D RD heat map tensor is configured based on one or more of sensing range, distance resolution, velocity resolution, a bandwidth of the chirp, a period of the chirp, the quantity of samples per chirp or a sampling rate.

Clause 14: The system of any one of Clauses 11-13, wherein the 2D RA heat map tensor includes an azimuth FFT representing the quantity of ADC channels and the range FFT representing the quantity of samples per chirp, wherein a size of the 2D RA heat map tensor is configured based on one or more of sensing range, distance resolution, angular resolution, a bandwidth of the chirp, or the quantity of ADC channels.

Clause 15: The system of any one of Clauses 11-14, wherein providing the 2D RA heat map tensor to the machine learning model comprises: receiving camera images from a camera of the vehicle; fusing the camera images with the 2D RA heat map tensor; and providing the fused data to the machine learning model.

Clause 16: The system of Clause 15, wherein the machine learning model includes a feature extraction layer, a spatial transformer, and a feature fusion layer.

Clause 17: A non-transitory, computer-readable storage medium having instructions stored thereon, that when executed by at least one processor, cause the at least one processor to perform operations, comprising: receiving analog-to-digital converter (ADC) raw data of a radar sensor of a vehicle; performing range fast Fourier transform (FFT), Doppler FFT, and azimuth FFT on the ADC raw data; generating a three-dimensional (3D) range-azimuth-Doppler (RAD) matrix tensor representing a combination of the range FFT, the Doppler FFT, and the azimuth FFT; and providing the 3D RAD matrix tensor to a machine learning model for detecting objects on a road network around the vehicle.

Clause 18: The computer-readable storage medium of Clause 17, wherein providing the 3D RAD matrix tensor to the machine learning model further comprises: receiving camera images from a camera of the vehicle; fusing the camera images with the 3D RAD matrix tensor; and providing the fused data to the machine learning model.

Clause 19: The computer-readable storage medium of Clause 17 or 18, wherein the 3D RAD matrix tensor includes the azimuth FFT representing the quantity of ADC channels, the Doppler FFT representing the quantity of chirps in each ADC channel, and the range FFT representing the quantity of samples per chirp.

Clause 20: The computer-readable storage medium of Clause 19, wherein a size of the 3D RAD matrix tensor is configured based on one or more of sensing range, distance resolution, velocity resolution, angular resolution, a bandwidth of the chirp, a period of the chirp, the quantity of samples per chirp or a sampling rate, or the quantity of ADC channels.

Clause 21: A system, comprising: at least one processor; and a memory storing instructions thereon that, when executed by the at least one processor, cause the at least one processor to perform operations, comprising: receiving analog-to-digital converter (ADC) raw data of a radar sensor of a vehicle; performing range fast Fourier transform (FFT) on the ADC raw data; generating a one-dimensional (1D) range heat map tensor representing the range FFT; and inputting the 1D range heat map tensor to a machine learning model for detecting objects on a road network around the vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system, comprising:
   at least one processor; and
   a memory storing instructions thereon that, when executed by the at least one processor, cause the at least one processor to perform operations, comprising:
   receiving analog-to-digital converter (ADC) raw data of a radar sensor of a vehicle;
   performing range fast Fourier transform (FFT) and Doppler FFT on the ADC raw data;
   generating a two-dimensional (2D) range-Doppler (RD) heat map tensor representing a combination of the range FFT and the Doppler FFT; and
   inputting the 2D RD heat map tensor to a first machine learning model to obtain a 2D range-azimuth (RA) heat map tensor; and
   inputting the 2D RA heat map tensor to a second machine learning model for detecting objects on road network around the vehicle.

2. The system of claim 1, wherein the first machine learning model includes a pre-encoder, a shared feature pyramidal network (FPN) encoder, and a range-angle decoder.

3. The system of claim 1, wherein the 2D RD heat map tensor includes the Doppler FFT representing a quantity of chirps in each ADC channel and the range FFT representing a quantity of samples per chirp, wherein a size of the 2D RD heat map tensor is configured based on one or more of a sensing range, a distance resolution, a velocity resolution, a bandwidth of a chirp, a period of the chirp, the quantity of samples per chirp or a sampling rate.

4. The system of claim 1, wherein the 2D RA heat map tensor includes an azimuth FFT representing a quantity of ADC channels and the range FFT representing a quantity of samples per chirp, wherein a size of the 2D RA heat map tensor is configured based on one or more of a sensing range, a distance resolution, an angular resolution, a bandwidth of a chirp, or the quantity of ADC channels.

5. The system of claim 1, wherein inputting the 2D RA heat map tensor to the second machine learning model comprises:
   receiving camera images from a camera of the vehicle;
   fusing the camera images with the 2D RA heat map tensor; and
   inputting fused data to the second machine learning model.

6. The system of claim 5, wherein the second machine learning model includes a feature extraction layer, a spatial transformer, and a feature fusion layer.

7. A method, comprising:
receiving analog-to-digital converter (ADC) raw data of a radar sensor of a vehicle;
performing range fast Fourier transform (FFT) and Doppler FFT on the ADC raw data;
generating a two-dimensional (2D) range-Doppler (RD) heat map tensor representing a combination of the range FFT and the Doppler FFT; and
inputting the 2D RD heat map tensor to a first machine learning model to obtain a 2D range-azimuth (RA) heat map tensor; and
inputting the 2D RA heat map tensor to a second machine learning model for detecting objects on road network around the vehicle.

8. The method of claim 7, wherein the first machine learning model includes a pre-encoder, a shared feature pyramidal network (FPN) encoder, and a range-angle decoder.

9. The method of claim 7, wherein the 2D RD heat map tensor includes the Doppler FFT representing a quantity of chirps in each ADC channel and the range FFT representing a quantity of samples per chirp, wherein a size of the 2D RD heat map tensor is configured based on one or more of a sensing range, a distance resolution, a velocity resolution, a bandwidth of a chirp, a period of the chirp, the quantity of samples per chirp or a sampling rate.

10. The method of claim 7, wherein the 2D RA heat map tensor includes an azimuth FFT representing a quantity of ADC channels and the range FFT representing a quantity of samples per chirp, wherein a size of the 2D RA heat map tensor is configured based on one or more of a sensing range, a distance resolution, an angular resolution, a bandwidth of a chirp, or the quantity of ADC channels.

11. The method of claim 7, wherein inputting the 2D RA heat map tensor to the second machine learning model comprises:
receiving camera images from a camera of the vehicle;
fusing the camera images with the 2D RA heat map tensor; and
inputting fused data to the second machine learning model.

12. The method of claim 11, wherein the second machine learning model includes a feature extraction layer, a spatial transformer, and a feature fusion layer.

13. A non-transitory, computer-readable storage medium having instructions stored thereon, that when executed by at least one processor, cause the at least one processor to perform operations, comprising:
receiving analog-to-digital converter (ADC) raw data of a radar sensor of a vehicle;
performing range fast Fourier transform (FFT) and Doppler FFT on the ADC raw data;
generating a two-dimensional (2D) range-Doppler (RD) heat map tensor representing a combination of the range FFT and the Doppler FFT; and
inputting the 2D RD heat map tensor to a first machine learning model to obtain a 2D range-azimuth (RA) heat map tensor; and
inputting the 2D RA heat map tensor to a second machine learning model for detecting objects on road network around the vehicle.

14. The computer-readable storage medium of claim 13, wherein the first machine learning model includes a pre-encoder, a shared feature pyramidal network (FPN) encoder, and a range-angle decoder.

15. The computer-readable storage medium of claim 13, wherein the 2D RD heat map tensor includes the Doppler FFT representing a quantity of chirps in each ADC channel and the range FFT representing a quantity of samples per chirp, wherein a size of the 2D RD heat map tensor is configured based on one or more of a sensing range, a distance resolution, a velocity resolution, a bandwidth of a chirp, a period of the chirp, the quantity of samples per chirp or a sampling rate.

16. The computer-readable storage medium of claim 13, wherein the 2D RA heat map tensor includes an azimuth FFT representing a quantity of ADC channels and the range FFT representing a quantity of samples per chirp, wherein a size of the 2D RA heat map tensor is configured based on one or more of a sensing range, a distance resolution, an angular resolution, a bandwidth of a chirp, or the quantity of ADC channels.

17. The computer-readable storage medium of claim 13, wherein inputting the 2D RA heat map tensor to the second machine learning model comprises:
receiving camera images from a camera of the vehicle;
fusing the camera images with the 2D RA heat map tensor; and
inputting fused data to the second machine learning model.

18. The computer-readable storage medium of claim 17, wherein the second machine learning model includes a feature extraction layer, a spatial transformer, and a feature fusion layer.

* * * * *